(12) United States Patent
Light-Holets et al.

(10) Patent No.: US 10,538,237 B2
(45) Date of Patent: Jan. 21, 2020

(54) FUEL AND REAGENT DEGRADATION REDUCTION IN HYBRID ELECTRICAL VEHICLE SYSTEMS

(71) Applicant: CUMMINS INC., Columbus, IN (US)

(72) Inventors: Jennifer K. Light-Holets, Greenwood, IN (US); Cliffton J. Burbrink, Westport, IN (US); Xu Chen, Columbus, IN (US)

(73) Assignee: Cummins Inc., Columbus, IN (US)

( * ) Notice: Subject to any disclaimer, the term of this patent is extended or adjusted under 35 U.S.C. 154(b) by 13 days.

(21) Appl. No.: 15/817,839

(22) Filed: Nov. 20, 2017

(65) Prior Publication Data

US 2018/0148041 A1 May 31, 2018

Related U.S. Application Data

(60) Provisional application No. 62/426,883, filed on Nov. 28, 2016.

(51) Int. Cl.
| | | |
|---|---|---|
| *B60W 20/18* | (2016.01) | |
| *F02D 41/02* | (2006.01) | |
| *F01N 3/20* | (2006.01) | |
| *B60W 10/04* | (2006.01) | |
| *B60W 50/14* | (2012.01) | |

(52) U.S. Cl.
CPC ............ *B60W 20/18* (2016.01); *B60W 10/04* (2013.01); *B60W 50/14* (2013.01); *F02D 41/0235* (2013.01); *B60W 2560/02* (2013.01); *B60W 2560/04* (2013.01); *B60W 2560/06* (2013.01); *B60W 2710/06* (2013.01); *B60W 2710/08* (2013.01); *F01N 3/2066* (2013.01); *F01N 2610/02* (2013.01); *F01N 2900/1818* (2013.01)

(58) Field of Classification Search
None
See application file for complete search history.

(56) References Cited

U.S. PATENT DOCUMENTS

| 9,581,101 B2 | 2/2017 | Huber | |
|---|---|---|---|
| 2009/0321159 A1* | 12/2009 | Andri | B60L 11/123 |
| | | | 180/65.25 |

(Continued)

FOREIGN PATENT DOCUMENTS

| FR | 2981402 | 12/2013 |
|---|---|---|
| FR | 2991378 | 12/2013 |
| JP | 2006-111602 | 4/2006 |

*Primary Examiner* — Thomas G Black
*Assistant Examiner* — Demetra R Smith-Stewart
(74) *Attorney, Agent, or Firm* — Foley & Lardner LLP (57) ABSTRACT

A hybrid electric vehicle system comprises an internal combustion (IC) engine and an electric engine providing power to a drive shaft of the vehicle. The IC engine receives a fuel from a fuel tank. Exhaust gases from the IC engine are treated at an exhaust treatment apparatus including a reagent tank containing a reagent. A controller monitors a quality of the fuel in the fuel tank and the reagent in the reagent tank and if needed, initiates fuel degradation reduction event or a reagent degradation reduction event. These events can include running the IC engine even if a battery supplying power to the motor is not discharged. The fuel degradation reduction event includes dosing the fuel tank with an anti-oxidant to reduce the rate of degradation of the fuel.

19 Claims, 6 Drawing Sheets

(56) References Cited

U.S. PATENT DOCUMENTS

| | | | |
|---|---|---|---|
| 2013/0173106 A1* | 7/2013 | Konishi | B60K 6/46 |
| | | | 701/22 |
| 2014/0238349 A1* | 8/2014 | Harle | F02M 37/0082 |
| | | | 123/444 |
| 2015/0019108 A1* | 1/2015 | Hendrickson | F01N 11/00 |
| | | | 701/102 |
| 2015/0121999 A1* | 5/2015 | Dudar | F02D 41/221 |
| | | | 73/114.39 |
| 2018/0068497 A1* | 3/2018 | Kurtz | F02D 41/021 |

* cited by examiner

FUEL AND REAGENT DEGRADATION REDUCTION IN HYBRID ELECTRICAL VEHICLE SYSTEMS

CROSS-REFERENCE TO RELATED APPLICATION

The present application claims priority to U.S. Provisional Patent Application No. 62/426,883, entitled "Fuel and Reagent Degradation Reduction in Hybrid Electrical Vehicle Systems" and filed Nov. 28, 2016. The contents of this application are incorporated herein by reference.

TECHNICAL FIELD

The present disclosure relates to hybrid electrical vehicle systems.

BACKGROUND

Hybrid electric vehicle (HEV) systems use an electric motor in conjunction with an internal combustion (IC) engine to drive a vehicle. In particular, range extender hybrid vehicle systems, such as plug-in hybrid electric vehicles (PHEV), utilize the electric motor as the primary source of propulsion. The electric motor draws power from an energy source, such as a battery. The IC engine, on the other hand, is primarily used to drive a generator, which, in turn, recharges the energy source. By using the IC engine to recharge the energy source, the range of the PHEV can be extended.

SUMMARY

In a first set of embodiments, An apparatus comprises a controller coupled to an internal combustion engine using one or more of a gaseous or liquid fuel, and to an electric motor coupled to a drive shaft of a vehicle. The controller is configured to determine a time or a distance since a last refueling event, the last refueling event comprising replacing or adding new fuel to a fuel tank containing the gaseous or liquid fuel. The controller is further configured to compare the time or distance with a threshold time or threshold distance, respectively and, responsive to the time or the distance being greater than the threshold time or the threshold distance, respectively, initiate at least one of: run the internal combustion engine, dose the fuel tank containing the gaseous or liquid fuel with an antioxidant, and actuate an indicator indicating that fuel replacement is overdue.

In a second set of embodiments, an apparatus comprises a controller coupled to an internal combustion engine using a gaseous or liquid fuel, and to an electric motor coupled to a drive shaft of a vehicle. The controller is configured to estimate a value for an amount of oxygen the fuel in a fuel tank is exposed to since a last refueling event, the last refueling event comprising replacing or adding new fuel to the fuel tank. The controller is further configured to compare the estimated value for the amount of oxygen to a threshold value and, responsive to the estimated value for the amount of oxygen being greater than the threshold, initiate at least one of: run the IC engine, dose the fuel tank containing the gaseous or liquid fuel with an antioxidant, and actuate an indicator indicating that fuel replacement is overdue.

In a third set of embodiments, an apparatus comprises a controller coupled to an internal combustion engine, to an exhaust treatment system including a tank containing a reductant reagent, and to an electric motor coupled to a drive shaft of a vehicle. The controller is configured to determine a time or a distance since a last reagent replacement event, the last reagent replacement event comprising replacing or adding new reductant reagent to the tank. The controller is further configured to compare the time or the distance with a threshold time or a threshold distance, respectively, and to, responsive to the time or the distance being greater than the threshold time or the threshold distance, respectively, initiate at least one of: run the IC engine, actuate an indicator indicating that reductant reagent replacement is needed, and adjust an operation of the exhaust treatment system.

In a fourth set of embodiments, an apparatus comprises a controller coupled to an internal combustion engine, to an exhaust treatment system including a tank containing a reductant reagent, and to an electric motor coupled to a drive shaft of a vehicle. The controller is configured to determine a concentration of urea in the reductant reagent, compare the concentration of urea to a threshold value, and, responsive to the concentration of threshold value being greater than the threshold, initiate at least one of: run the IC engine, actuate an indicator indicating that reductant reagent replacement is needed, and adjust an operation of the exhaust treatment system.

These and other features, together with the organization and manner of operation thereof, will become apparent from the following detailed description when taken in conjunction with the accompanying drawings.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion assemblies and methods of operating internal combustion assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
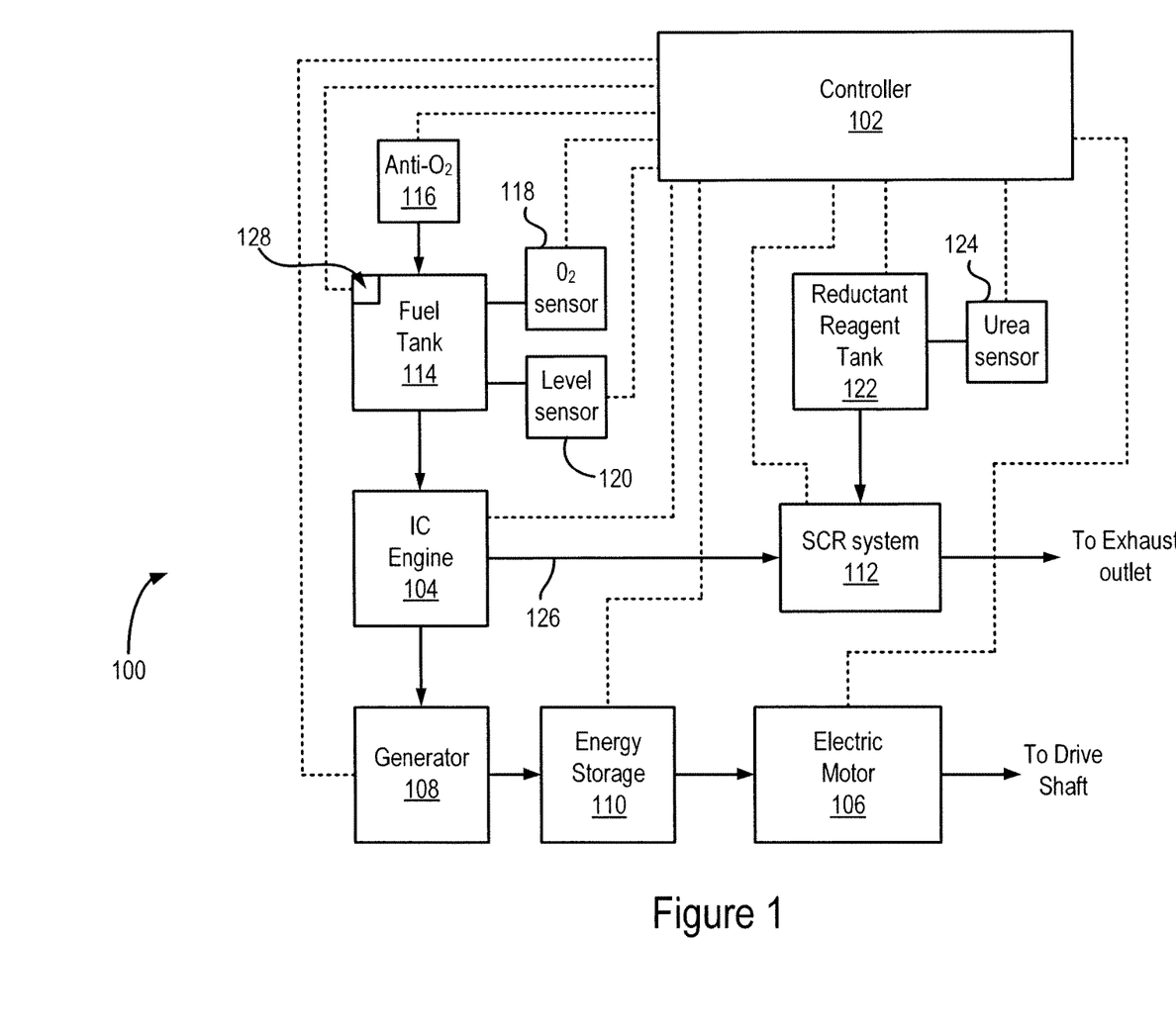
FIG. 1 shows a representation of an example vehicle propulsion system, according to an embodiment of the present disclosure.

FIG. 1 shows a representation of an example vehicle propulsion system 100. The vehicle propulsion system 100 comprises an internal combustion (IC) engine 104 and an electric motor 106. The IC engine 104 receives fuel from a fuel tank 114, which is used by the IC engine 104 to generate power and drive a generator 108. The generator 108, in turn, transforms mechanical power provided by the IC engine 104 into electrical energy to charge an energy source 110. The energy source 110 provides electrical energy to the electric motor 106. The IC engine 104 also produces an exhaust fluid stream 126, which is treated by a selective catalytic reduction (SCR) system 112 before being disposed through an exhaust outlet. A controller 102 controls the operation of the propulsion system 100, and receives input from, and sends controls signals to, various components of the propulsion system 100. The controller 102 is discussed in detail further below.

The fuel tank 114 stores fuel, which is provided to the IC engine 104. In some embodiments, the fuel tank 114 stores diesel fuel. In some other embodiments, the fuel tank 114 stores biodiesel fuel. In yet other embodiments, the duel tank 114 can store gasoline, propane, kerosene, and/or other fuels suitable for running the IC engine 104 (including combinations of the fuels described herein). In some embodiments, the fuel tank 114 can be coupled to a breather valve 128, which can selectively open or close to maintain a predetermined pressure within the fuel tank 114. An oxygen sensor 118 is coupled to the fuel tank 114, and can sense the level of oxygen within the fuel tank 114. In one or more embodiments, the oxygen sensor 118 can indicate the air/fuel ratio within the fuel tank 114. In some other embodiments, the oxygen sensor 118 can provide a concentration of oxygen within the fuel tank 114. The output of the oxygen sensor 118 is provided to the controller 102. A level sensor 120 measures the fuel level in the fuel tank 114 and provides the measured fuel level to the controller 102. An antioxidant dispenser 116 also is coupled to the fuel tank 114 and can dispense antioxidant into the fuel tank 114. In one or more embodiments, the antioxidant dispenser 116 dispenses antioxidant into the fuel tank 114 in response to an input received from the controller 102. In one or more embodiments, the antioxidant dispenser 116 can dispense antioxidants into the fuel tank 114 via a fuel filter (not shown). In one or more embodiments, antioxidants such as, butylated hydroxyl toluene (BHT), butylated hydroxyanisole (BHA), phenylenediamines (PDA), a mixture of at least one aromatic diamine and at least one sterically hindered phenol, ETHANOX® fuel antioxidant, and the like can be stored and dispensed by the antioxidant dispenser 116. In one or more embodiments, the oxygen sensor 118 can also provide in indication of the amount of antioxidant present in the fuel tank 114. As mentioned above, the antioxidant prevents the reaction of oxygen with the fuel. A rapid decrease in oxygen level can indicate a high level of reaction with oxygen due to a low level of antioxidant present in the fuel. Conversely, a slow decrease in oxygen level can indicate a relatively higher amount of antioxidant present in the fuel tank 114.

As mentioned above, the exhaust fluid stream 126 is fed to the SCR system 112. The SCR system 112 treats the exhaust fluid stream 126 to reduce nitrogen oxide (NOx) emissions. In particular, the SCR system 112 reduces NOx using a reductant reagent within a catalyst system. A reductant reagent tank 122 provides the reductant reagent to the SCR system 112. The reductant reagent is typically introduced into the exhaust fluid stream 126 upstream from the SCR system 112. Once treated by the SCR system 112, the exhaust fluid stream 126 is converted into nitrogen, water, and small amounts of carbon dioxide and nitrogen oxide. In one or more embodiments, the reductant reagent can comprise diesel exhaust fluid (DEF), which is formed of urea and de-ionized water. In particular embodiments, the DEF can comprise 32.5% urea and 67.5% de-ionized water. A urea sensor 124 is coupled to reductant reagent tank 122 and senses the quality of the reductant reagent in the reductant reagent tank 122. For example, in one or more embodiments, the urea sensor 124 measures the concentration of urea in the tank 122, and provides the measured concentration to the controller 102.

A controller 102 controls the operation of the propulsion system 100. For example, the controller 102 can control a state (ON/OFF/RPM) of the electric motor 106 in response to a throttle input received from the driver. The controller 102 also monitors an energy level of the energy storage 110. For example, if the energy level of the energy storage 110 drops below a threshold, the controller 102 can start the IC engine 104 so that the generator 108 can charge the energy storage 110, and bring the energy level at or above the desired threshold. In some other embodiments, the controller provides an aural/visual annunciation to the driver suggesting plugging the vehicle to an external electrical charger.

As the propulsion system 100 primarily relies on the electric motor 106 to provide driving power, and only intermittently relies on the IC engine 104 for charging the energy storage 110, the IC engine 104 is used for a relatively small amount of time compared to the time IC engines in non-hybrid, diesel/biodiesel powered vehicles are used. One drawback of reduced use of the IC engine 104 is that the fuel may remain in the fuel tank 114 for an extended period of time. For example, it may not be uncommon for the fuel to remain in the fuel tank for weeks or longer. Similarly, as the SCR system is operational only when the IC engine 104 is switched ON, the reductant reagent remains in the reductant reagent tank 122 for an extended period of time.

Having the fuel remain in the fuel tank 114 can cause degradation of the fuel. For example, storing diesel fuel for an extended period of time may result in the formation of "sludge," which degrades the quality of diesel. Further, the formation of the sludge may be accelerated by extended exposure to oxygen and high temperatures, which is quite likely when the diesel is stored in the fuel tank 114 for long durations. Similarly, the reductant reagent may also degrade by remaining in the reductant reagent tank 122 for long durations. For example, the water in the DEF may evaporate over time, increasing the concentration of urea. High concentrations of urea in the DEF may result in inadequate reduction of NOx in the SCR system 112, which in turn results in high NOx emissions. The following discusses apparatus and techniques that address the degradation of fuel and the reductant reagent in hybrid vehicles, such as the one shown in FIG. 1.

Figure 2:
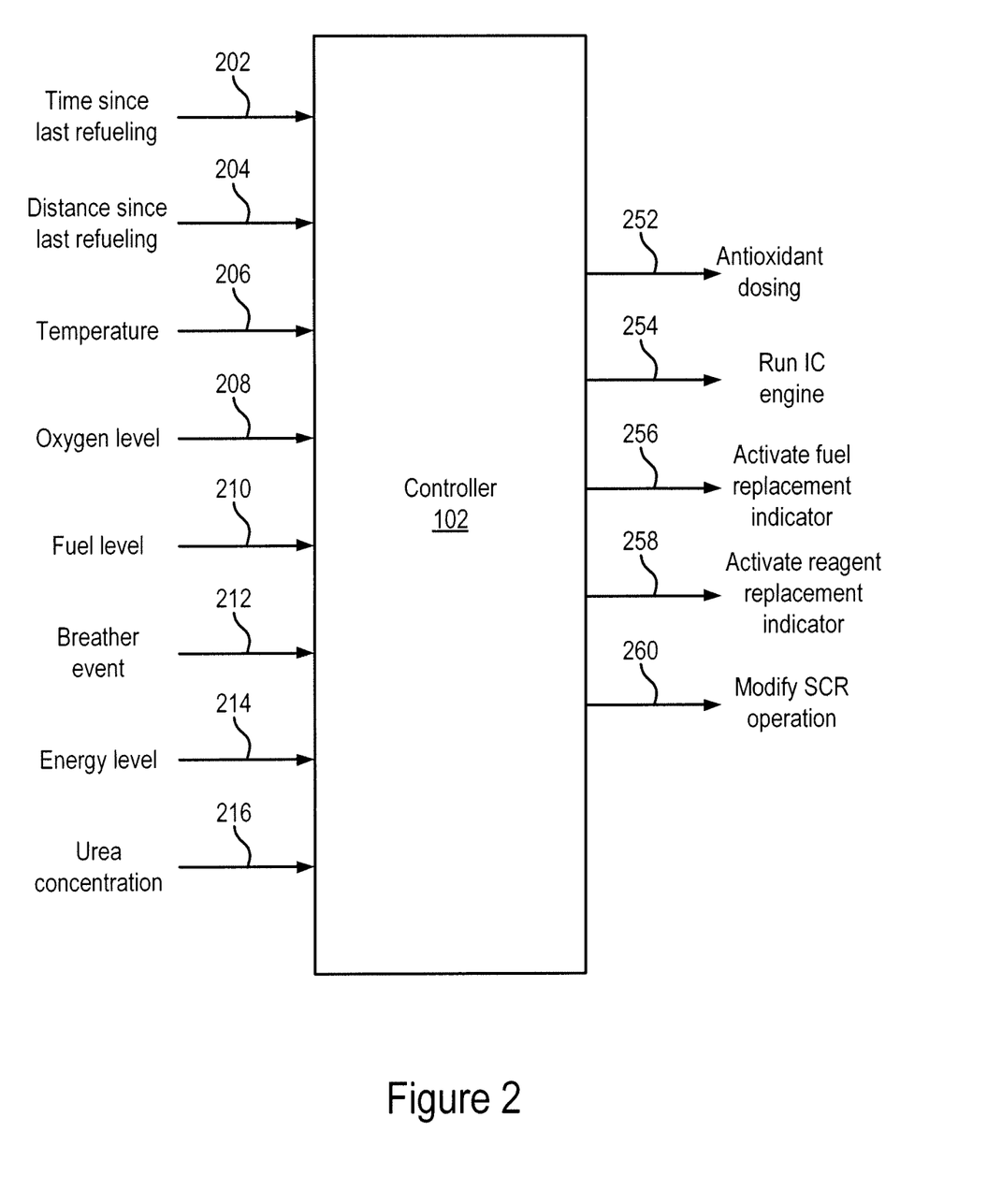
FIG. 2 shows a representation of inputs and outputs of the controller of the propulsion system shown in FIG. 1.

FIG. 2 shows a representation of inputs and outputs of the controller 102 of the propulsion system 100 shown in FIG. 1. In particular, FIG. 2 shows a set of measurements and parameters the controller 102 receives to determine whether to initiate fuel and/or reductant reagent degradation reduction techniques, and if initiated, which of the several techniques to initiate. The controller 102 receives as input: time since last refueling 202, distance traveled since last refueling 204, temperature 206, oxygen level 208 in the fuel tank, fuel level 210 in the fuel tank, fuel tank breather open event 212, energy level 214 of the energy storage, and urea concentration 216 in the reductant reagent tank. Additional inputs to the controller 102, such as operational status of one or more components of the propulsion system 100, may also be received. Based on one or more of aforementioned inputs, the controller can output actuation signals to: dose the fuel with antioxidants 252, run the IC engine 254, activate fuel replacement indicator 256, activate reagent replacement indicator 258, and modify SCR operation 260.

With regard to the inputs received by the controller 102, the time since last refueling 202 can be accessed from a memory of the controller 102, which may store the date and time of such events. In one or more embodiments, the controller 102 may receive this information over the air (OTA), for example, through a cellular communication link, from a fleet or back office. The distance traveled since the last refueling 204 indicates the number of miles/kilometers traveled since the last time the vehicle was refueled. This distance information may also be accessed from the memory or received OTA. The temperature 206 can indicate the current temperature or an average temperature over a duration, in degrees centigrade or Fahrenheit. A temperature sensor located within or near the fuel tank 114 can be used to provide the temperature to the controller 102. The oxygen level 208 in the fuel tank provides one indication of the air-to-fuel ratio in the fuel tank 114. The oxygen level 208 may be provided by the oxygen sensor 118 coupled to the fuel tank 114. Fuel level 210 in the fuel tank can indicate the amount of fuel in the fuel tank 114. This information may be provided by the level sensor 120 coupled to the fuel tank 114.

The fuel breather open event 212 can indicate the opening of a breather 128 to equalize the pressure levels between the inside and the outside of the fuel tank 114. In one or more embodiments, the opening of the breather 128 may increase the proportion of oxygen within the fuel tank 114. The breather can provide input to the controller each time it opens. In some embodiments, the controller 102 may control the opening of the breather. In some such embodiments, the controller 102 can store in memory the number of times the breather 128 has been instructed to open. The energy level 214 may be provided by the energy storage 110. The energy level 214 may indicate a magnitude of a voltage across the terminals of the batteries, a magnitude of a current supplied by the batteries, an amount of charge stored in the battery, and any other information that can represent an energy level of the energy storage 110. The urea concentration 216 can indicate the ratio of urea/water in the reductant reagent stored in the reductant reagent tank 122. This information may be received from the urea sensor 124 coupled to the reductant reagent tank 122.

With regards to the outputs of the controller 102, the dosing actuation signal 252 can be sent to the antioxidant dispenser 116, which doses the fuel in the fuel tank 114 with antioxidants. The antioxidants, when introduced into the fuel tank 114, limit the degree of oxidation of the fuel and limit the formation of free radicals in the fuel stored in the fuel tank 114, thereby reducing the amount of sludge and other deteriorated fuel products from forming. The IC engine turn ON actuation signal 254 switches ON the IC engine 104. This causes the consumption of the fuel in the fuel tank 114. In some embodiments, the controller 102 may normally switch ON the IC engine 104 only when the energy level of the energy storage 110 is below a threshold. However, in some embodiments, the IC engine 104 may be turned ON even if the energy storage 110 is at acceptable energy levels. This is because turning ON the IC engine 104 accelerates the consumption of fuel from the fuel tank 114. As a result, the fuel level in the fuel tank 114 would lower at a faster rate than it normally would, thereby stimulating fuel replacements at a faster rate. As new fuel is added more frequently, the risk of formation of sludge is reduced.

The fuel replacement indication signal 256 can include activating a "refuel" audio/visual indicator on the dashboard of, or elsewhere in, the vehicle. This signal may be activated even if the fuel level in the fuel tank 114 is above acceptable levels. Rather, the signal may be activated if the fuel has remained in the tank for too long. Prompting the driver to add new fuel to the fuel tank 114 can reduce the risk of formation of sludge. In one or more embodiments, the controller 102 can instead of, or in addition to, activating a "refuel" audio/visual indicator in the vehicle, send a message to a back-office or a fleet operation office indicating that refueling is due for the associated vehicle. In one or more embodiments, the controller 102 can send the message using a wireless communication system, such as WiFi, Bluetooth, cellular network, satellite network, and the like. The controller 102 also may send the message to a wireless device such as a smartphone, pager, and the like, located with the driver, or at the fleet office. The fleet office, in response to receiving the message can use the information as one factor in their operation of the fleet. For example, in one or more embodiments, the fleet office may reassign the vehicle to a longer route, which may induce turning ON the IC engine, and thereby resulting in increased fuel consumption. In one or more embodiments, the field office may instruct the driver to refuel at particular locations that are on the assigned route. In yet other implementations, the fleet office may send a message to the controller to dose the tank with antioxidants.

The reagent replacement indicator signal 258 can include a "replace reagent/DEF" audio/visual indicator on the dashboard of, or elsewhere in, the vehicle. The reagent replacement indication signal 258, similar to the fuel replacement indication signal 256, may be activated even if the level of the reagent within the reductant reagent tank 122 is at acceptable levels. Rather, the reagent replacement indication signal 258 may be activated if the reagent has remained in the reductant reagent tank 122 for too long. By prompting the driver to add or replace the reagent in the reductant reagent tank 122, the risk of degradation of the quality of the reagent can be reduced. As mentioned above in relation to the "refuel" indicator, the controller 102 can send a message to the fleet office or a back office indicating that the reagent may need replacement. In one or more embodiments, the controller 102 may also adjust the operation of the IC engine 104 to induce increased consumption of the reductant reagent. For example, the controller 102 may adjust the operation of the IC engine 104 such that the amount of NOx in the exhaust fluid stream 126 increases. This increase in the NOx in the exhaust fluid stream 126 can be detected by the SCR system 112, which in turn increases the amount of reagent introduced within the SCR system 112.

In one or more embodiments, the controller 102 can comprise a processor, a controller, a digital logic circuit, and a computer. The controller 102 can comprise or be coupled to a memory (volatile memory such as RAM, and non-volatile memory such as, a magnetic memory, a ROM and a EEPROM), a communication interface (such as on-board diagnostics (OBD)-II), an input (such as switches, keypad, trackpad, and the like) and an output (such as a display). The controller 102 also may comprise a communication module for sending messages to and receiving messages from a fleet or back office. The communication module can be capable to communicate over one or more wireless or wired technologies. For example, the communication module can be capable of communicating over WiFi, Bluetooth, cellular network, satellite network, and the like.

Figure 3A:
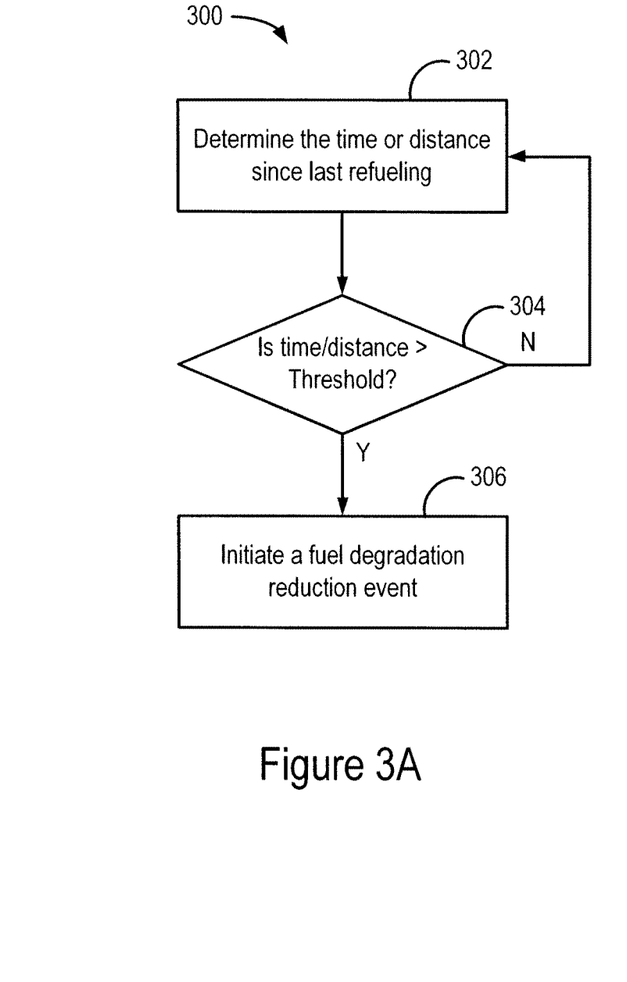
FIGS. 3A-3F show one or more techniques used by the controller shown in FIG. 1 to reduce the degradation of a fuel or a reagent.
Figure 3B:
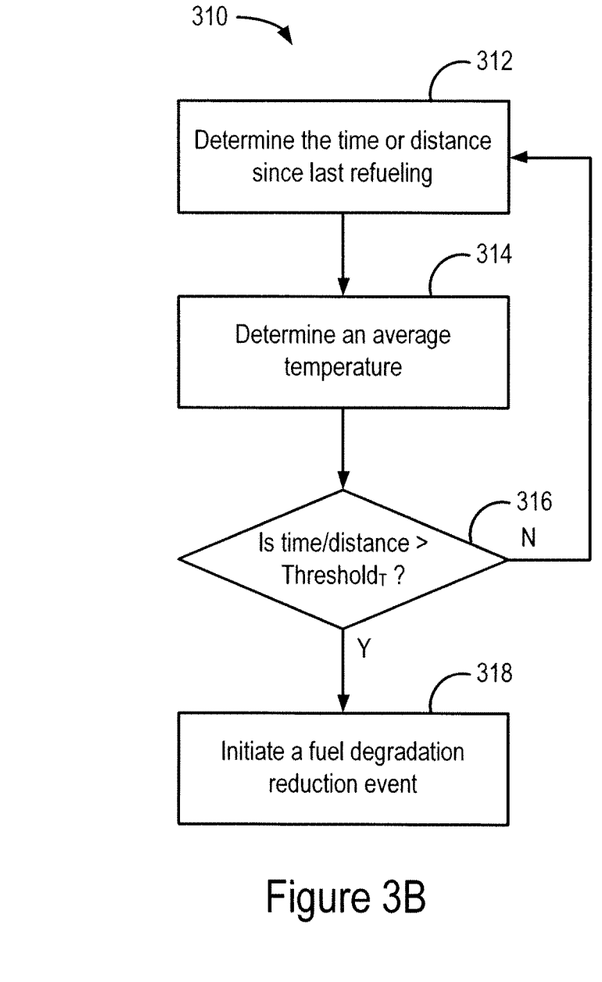
Figure 3C:
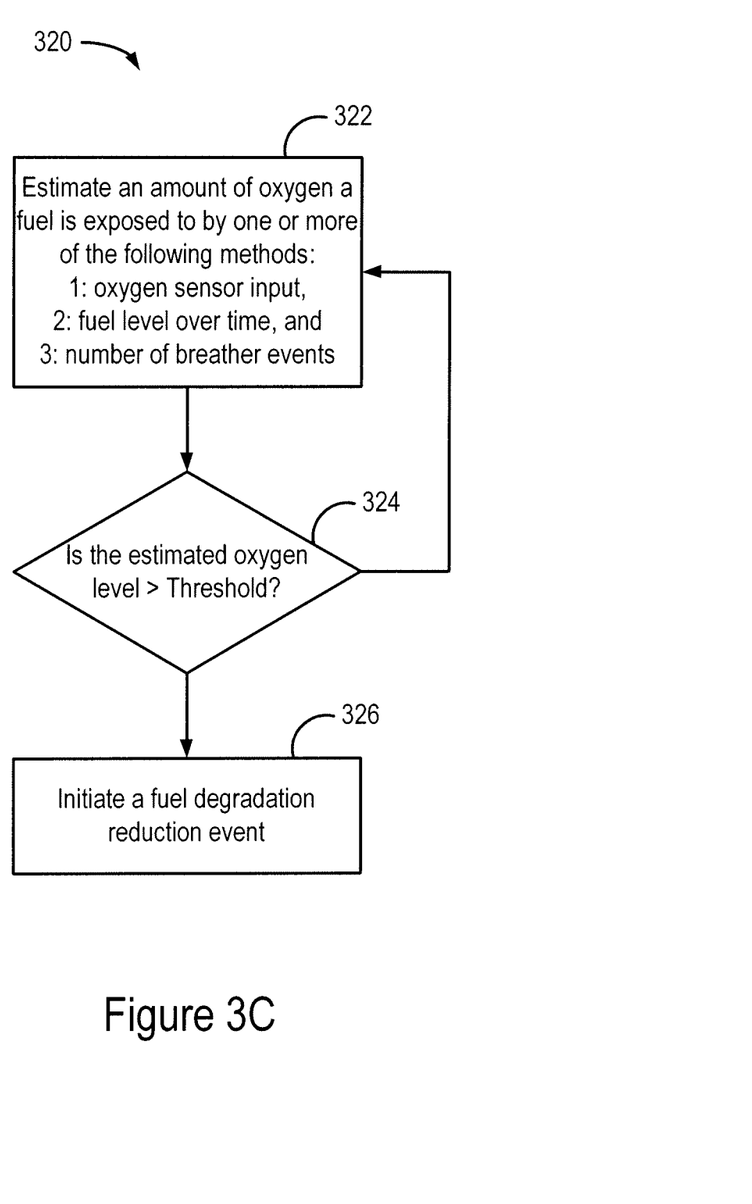
Figure 3D:
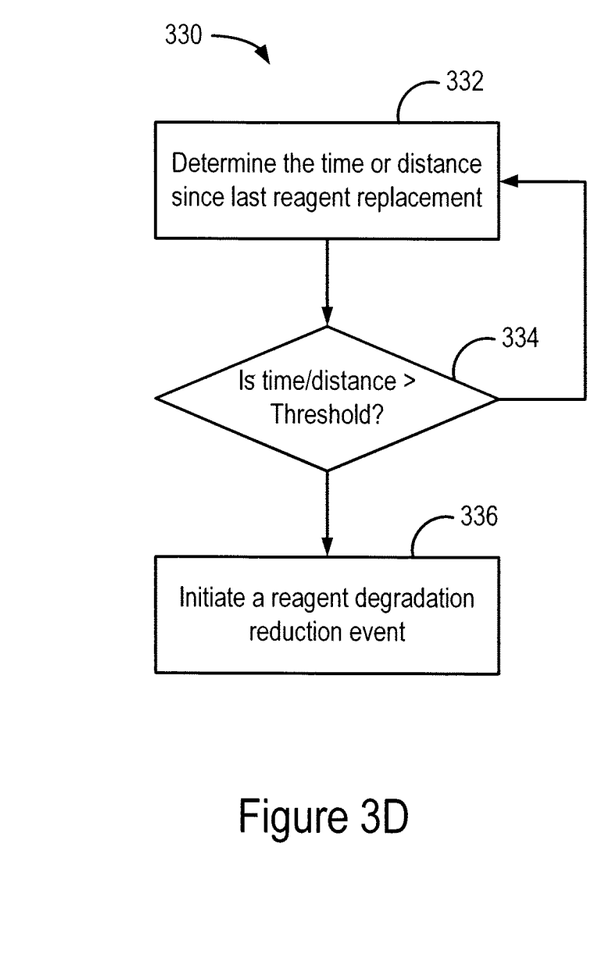
Figure 3E:
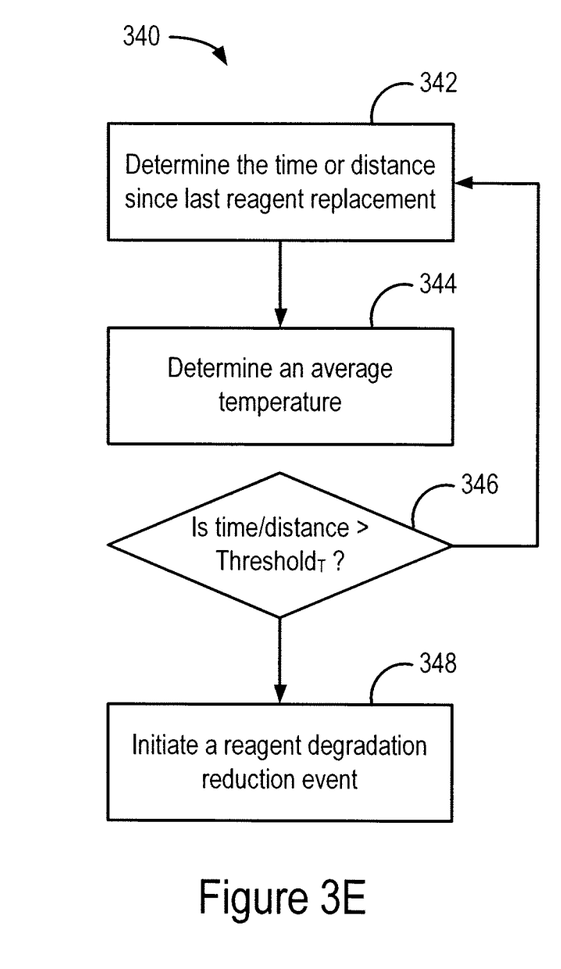
Figure 3F:
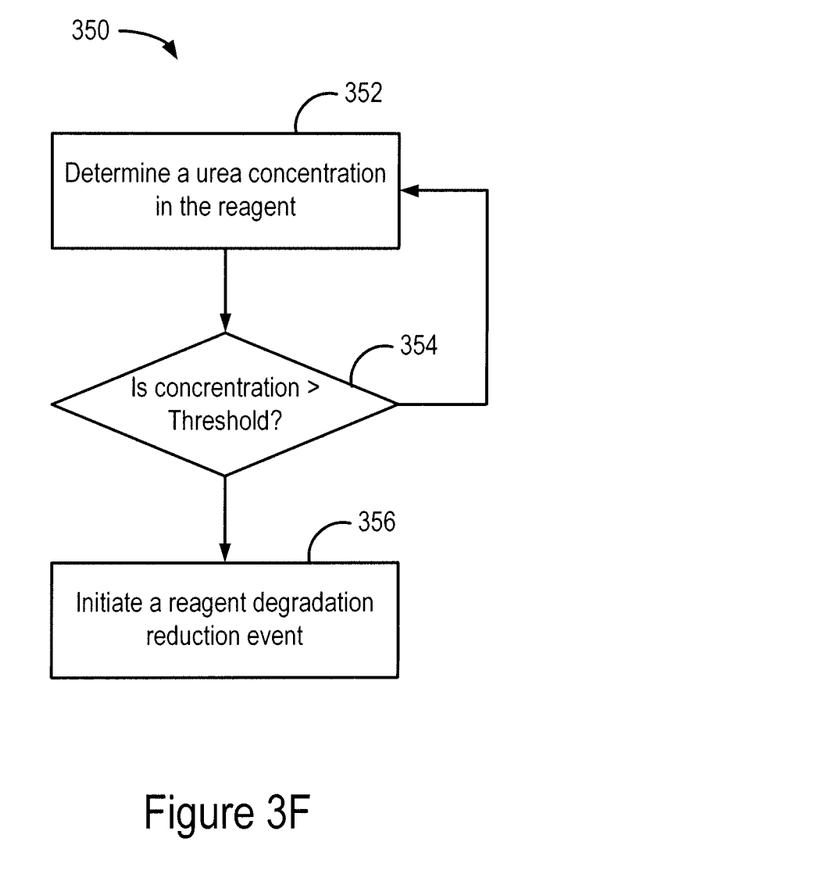

FIGS. 3A-3F show one or more techniques used by the controller 102, based on the inputs (shown in FIG. 2) received by the controller 102, to output actuation signals (shown in FIG. 2) to reduce the degradation of a fuel or a reagent. FIGS. 3A and 3D show flow charts of example processes 300 and 330 implementing a time or distance based technique, FIGS. 3B and 3E show flow charts of example processes 310 and 340 implementing a time, distance, and temperature based technique. FIG. 3C shows a flow chart of an example process 320 implementing an oxygen level technique, while FIG. 3F shows a flow chart of an example process 350 implementing an urea level technique. Each of the processes shown in FIGS. 3A-3F can be executed by the controller 102 discussed above in relation to FIGS. 1 and 2.

Referring to FIG. 3A, the process 300 comprises determining a time or distance since a last refueling event (302), determining whether the determined time or distance is greater than a threshold time or distance (304), and actuating a fuel degradation reduction event if the determined time or distance is greater than the threshold (306). The process 300 estimates the degradation of the fuel in the fuel tank (such as the fuel tank 114 shown in FIG. 1) based on a time or distance since a last refueling event. As mentioned above in relation to FIG. 2, the controller can receive this information from the time since last refueling input 202 and a distance since last refueling input 204. As discussed above, diesel and biodiesel fuels degrade over time and form sludge. The controller can set a threshold value for time or distance that if exceeded can indicate that the fuel is degraded. In some embodiments, the threshold time and the threshold distance can be experimentally determined. In some other embodiments, the threshold time and the threshold distance can be analytically determined. In some embodiments, the threshold time can be between about one month and about one year. In some embodiments, the threshold distance can be determined also based on the average distance driven per unit of time. For example, the threshold distance can be between about the average distance driven for a month to about the average distance driven for a year. In some embodiments, process 304 can be modified to determine whether both time and distance are above their respective thresholds.

If the time/distance is greater than the threshold, the controller can initiate a fuel degradation reduction event (306). For example, the controller 102 can actuate one or more of the dosing actuation signal 252, the IC engine ON actuation signal 254, and fuel replacement indication signal 256 (shown in FIG. 2) to initiate a fuel degradation reduction event. By actuating the dosing actuation signal 252, the antioxidant dispenser 116 dispenses a certain amount of antioxidant into the fuel tank 114. As the antioxidant limits the rate of oxidation of the fuel and limit the formation of free radicals, the rate of degradation of the fuel is reduced. By actuating the IC engine ON actuation signal 254, the IC engine is turned ON, thereby speeding up the consumption of the fuel in the fuel tank 114. As a result, the fuel level in the fuel tank will reach at or below the designated low fuel warning level more quickly. By actuating the fuel replacement indication signal 256, a fuel replacement indicator is actuated on, for example, a dashboard of the vehicle. This indication signal may be activated even if the fuel level in the fuel tank 114 is at or above the designated low fuel warning level. As a result, assuming that the driver duly refuels, the newly added fuel can improve the overall quality of the fuel in the fuel tank 114. In one or more embodiments, the controller 102 can initiate more than one of the actuation signals mentioned above. For example, the controller 102 can actuate both the dosing actuation signal 252 and the engine ON actuation signal 254 simultaneously.

FIG. 3B shows a flow chart of an example process 310 implementing a time, distance, and temperature based technique. The process 310 is similar to the process 300 shown in FIG. 3A, in that like the process 300, the process 310 also determines the time or distance since the last refueling (312), but unlike the process 300, the process 310 also takes into consideration the temperature to which the fuel is exposed since the last refueling event (314). In some embodiments, the controller 102 can receive a temperature input (206 in FIG. 2), which can be recorded by the controller 102 over a predetermined duration. For example, the duration can be the time since the last refueling event. Further the threshold values of time and distance can be a function of temperature (Threshold$_T$). This takes into consideration the fact that degradation of the fuel accelerates under high temperatures. Therefore, the controller 102 can reduce the time and distance thresholds with an increase in the average temperature. The relationship between the threshold values (Threshold$_T$) of the time and distance since last refueling can be determined experimentally or analytically. In one or more embodiments, the controller 102 can store a look up table listing threshold values of time and distance corresponding to various values of average temperature. If the time or distance since the last refueling event is greater than the temperature based threshold (316), the controller 102 initiates a fuel degradation reduction event (318). The initiation of a fuel degradation reduction event can be executed similar to that described above in relation to FIG. 3A.

FIG. 3C shows a flow chart of an example process 320 implementing an oxygen level technique. The process 320 includes estimating an amount of oxygen to which a fuel is exposed (322). The amount of oxygen to which the fuel is exposed to can be estimated using an input from an oxygen sensor (oxygen level input 208), using fuel level readings over time (fuel level input 210), or based on a number of fuel tank breather events (breather event input 212). As mentioned above, with reference to FIG. 2, the controller 102 can receive oxygen level input from an oxygen sensor (118, FIG. 1). The controller 102 can monitor the oxygen level in the fuel tank over time to estimate the amount of oxygen to which the fuel in the fuel tank has been exposed. Further, by monitoring the oxygen level over time, the controller 102 can estimate the amount of oxygen that has reacted with the fuel. The controller 102 also can receive the fuel level input over time, and based on the size of the fuel tank and an initial fuel level reading, the controller 102 can determine the amount of air in the fuel has been exposed to over time. Based on this, the controller 102 can estimate the amount of oxygen to which the fuel has been exposed. The controller also may keep a count of the number of breather events occurring over time. As mentioned above, a breather even may occur to equalize the pressure between the inside and the outside of the fuel tank. In some instances, the opening of the breather can result in introduction of air (and therefore oxygen) into the fuel tank. By estimating the amount of air introduced into the fuel tank per breather event, and the number of breather events, the amount of oxygen to which the fuel is exposed to can be estimated.

The controller 102 can compare the estimated amount of oxygen to which the fuel in the fuel tank is exposed to a threshold value (324). In one or more embodiments, the controller 102 can determine the threshold value experimentally, while in some other embodiments, the threshold value can be determined analytically, and stored in the memory. If the estimated amount of oxygen exceeds the threshold value, then the controller 102 can initiate one or more fuel degradation reduction event (326). The initiation of one or more fuel degradation reduction events can be similar to the initiation of one or more fuel degradation reduction events discussed above in relation to process 300 shown in FIG. 3A.

FIG. 3D shows an example process 330 for reducing degradation of a reductant reagent stored in a reductant reagent tank (122, FIG. 1). The process 340 comprises determining a time or distance since the last reagent replacement event (332). In one or more embodiments, the controller 102 can store in memory the date and time at which the last replacement of the reagent in the reductant reagent tank occurred. The controller 102 also can store in memory threshold time or distance values, that correspond to the time or distance after which the reagent has degraded to a level that warrants replacement. The threshold time and distance values can be experimentally or analytically determined. The process 340 further comprises determining whether the determined time or distance values are greater than their respective threshold values (334). If yes, then the controller 102 can initiate one or more reagent degradation reduction events (336). For example, in one or more embodiments, the controller can turn ON the IC engine 104 even if the energy level of the energy storage 110 is above a minimum energy level (254, FIG. 2). As turning ON the IC engine 104 also turns ON the SCR system 112, the consumption of the reagent is increased. As a result, the reagent will run out relatively quickly, and can be replaced relatively earlier. The controller 102 may also activate a reagent replacement indicator (258, FIG. 2) prompting the driver to replace the reagent. In some other embodiments, the controller 102 can adjust the operation of the SCR system 112 to adapt to the degraded quality of the reagent.

FIG. 3E shows an example process 340 for reducing degradation of a reductant reagent based on time, distance and temperature. In particular, the process 340 comprises determining a time and a distance since the last reagent replacement event (342). The process 340 further comprises determining an average temperature since the last reagent replacement event (344). By considering the temperature to which the reagent was exposed, the process 340 can improve the estimation of the degradation of the reagent. The controller 102 takes into consideration that the degradation of the reagent exacerbates with an increase in temperature. Thus, the controller 102 can determine the average temperature to which the reagent was exposed from the last time the reagent was replaced. The controller 102 can compare the determined time or distance to temperature based threshold values of time and distance, respectively (346). In one or more embodiments, the controller 102 can determine the temperature based threshold values experimentally or analytically. In one or more embodiments, a look up table listing threshold values of time and distance corresponding to various values of average temperature can be stored in memory. The controller can determine the appropriate threshold values based on the determination of the average temperature. If the time or distance values exceed the temperature based threshold values, the controller 102 can initiate one or more reagent degradation reduction events. As discussed above, the one or more reagent degradation reduction events can comprise running the IC engine, providing an reagent replacement indication to the driver, and adjusting the operation of the SCR system 112 to accommodate the degradation of the reagent.

FIG. 3F shows a flow chart of an example process 350 implementing an urea level technique. The process 350 comprises determining a urea concentration in the reagent. For example, referring to FIG. 1, the controller 102 can receive an input from a urea sensor 124 that measures the concentration of urea in the reagent stored in the reductant reagent tank 122. The controller 102 can compare the measured value of urea concentration with a threshold value (354). If the measured value exceeds the threshold value, the controller 102 can initiate one or more reagent degradation reduction event (356). As discussed above, the one or more reagent degradation reduction events can comprise running the IC engine, providing a reagent replacement indication to the driver, and adjusting the operation of the SCR system 112 to accommodate the degradation of the reagent.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An apparatus, comprising:
a controller coupled to an internal combustion engine using a gaseous or liquid fuel, and to an electric motor coupled to a drive shaft of a vehicle, the controller configured to:
determine a time or a distance since a last refueling event, the last refueling event comprising replacing or adding new fuel to a fuel tank containing the gaseous or liquid fuel;
compare the time or distance with a threshold time or threshold distance, respectively; and
responsive to the time or the distance being greater than the threshold time or the threshold distance, respectively, cause an antioxidant dispenser to dose the fuel tank with an antioxidant and run the internal combustion engine or actuate an indicator indicating that fuel replacement is overdue.

2. The apparatus of claim 1, wherein the controller is further configured to:
determine an average temperature since the last refueling event, and
adjust the threshold time or threshold distance based on the determined average temperature.

3. The apparatus of claim 1, wherein the controller is further configured to run the internal combustion engine while an energy level of an energy storage supplying power to the electric motor is greater than a designated low energy level.

4. The apparatus of claim 1, wherein the gaseous or liquid fuel comprises one or more of diesel, biodiesel, gasoline, propane, and kerosene.

5. The apparatus of claim 1, wherein the controller is further configured to estimate a degradation of the gaseous or liquid fuel responsive to the time or the distance being greater than the threshold time or the threshold distance, respectively; and
wherein at least one of: a length of time that the internal combustion engine is run, an amount of the antioxidant that is dosed into the fuel tank, or a length of time that the indicator is actuated, is related to the estimated degradation of the gaseous or liquid fuel.

6. An apparatus, comprising:
a controller coupled to an internal combustion engine using a gaseous or liquid fuel, and to an electric motor coupled to a drive shaft of a vehicle, the controller configured to:
estimate a value for an amount of oxygen the gaseous or liquid fuel in a fuel tank is exposed to since a last refueling event, the last refueling event comprising replacing or adding new fuel to the fuel tank;
determine a time or a distance since the last refueling event;
compare the estimated value for the amount of oxygen to a threshold value;
adjust a threshold time or a threshold distance based upon the comparison between the estimated value for the amount of oxygen and the threshold value;
compare the time or distance with the threshold time or the threshold distance, respectively; and
responsive to the time or the distance being greater than the threshold time or the threshold distance, respectively, initiate at least one of: run the internal combustion engine, dose the fuel tank containing the gaseous or liquid fuel with an antioxidant, or actuate an indicator indicating that fuel replacement is overdue.

7. The apparatus of claim 6, wherein the controller is further configured to estimate the value of the amount of oxygen based on an input from an oxygen sensor coupled to the fuel tank.

8. The apparatus of claim 6, wherein the controller is further configured to estimate the value of the amount of oxygen based on an input from a fuel level sensor coupled to the fuel tank.

9. The apparatus of claim 6, wherein the controller is further configured to estimate the value of the amount of oxygen based on a number of times a fuel tank breather is activated.

10. The apparatus of claim 6, wherein the controller is further configured to run the internal combustion engine while an energy level of an energy storage supplying power to the electric motor is greater than a designated low energy level.

11. An apparatus, comprising:
a controller coupled to an internal combustion engine, to an exhaust treatment system including a tank containing a reductant reagent, and to an electric motor coupled to a drive shaft of a vehicle, the controller configured to:
determine a time or a distance since a last reagent replacement event, the last reagent replacement event comprising replacing or adding new reductant reagent to the tank;
compare the time or the distance with a threshold time or a threshold distance, respectively, and
responsive to the time or the distance being greater than the threshold time or the threshold distance, respectively, adjust an operation of the exhaust treatment system to accommodate degradation of the reductant reagent.

12. The apparatus of claim 11, wherein the controller is further configured to:
determine an average temperature since the last reagent replacement event, and adjust the threshold time or threshold distance based on the determined average temperature.

13. The apparatus of claim 11, wherein the controller is further configured to run the internal combustion engine while an energy level of an energy storage supplying power to the electric motor is greater than a designated low energy level.

14. The apparatus of claim 11, wherein the controller is further configured to estimate a degradation of the reductant reagent responsive to the time or the distance being greater than the threshold time or the threshold distance, respectively; and
   wherein at least one of: a length of time that the internal combustion engine is run, a length of time that an indicator is actuated, or the adjustment made to the operation of the exhaust treatment system, is related to the estimated degradation of the reductant reagent.

15. The apparatus of claim 11, wherein the controller is further configured to store, in memory, at least one of a date or a time at which a most recent replacement of the reductant reagent occurred.

16. The apparatus of claim 11, wherein the internal combustion engine uses a gaseous or liquid fuel; and
   wherein the controller is further configured to:
      determine a second time or a second distance since a last refueling event, the last refueling event comprising replacing or adding new fuel to a fuel tank containing the gaseous or liquid fuel;
      compare the second time or second distance with a second threshold time or a second threshold distance, respectively; and
      responsive to the second time or the second distance being greater than the second threshold time or the second threshold distance, respectively, initiate at least one of: run the internal combustion engine, dose the fuel tank containing the gaseous or liquid fuel with an antioxidant, or actuate an indicator indicating that fuel replacement is overdue.

17. An apparatus, comprising:
   a controller coupled to an internal combustion engine, to an exhaust treatment system including a tank containing a reductant reagent, and to an electric motor coupled to a drive shaft of a vehicle, the controller configured to:
      determine a concentration of urea in the reductant reagent;
      compare the concentration of urea to a threshold value;
      responsive to the concentration of threshold value being greater than the threshold, initiate at least one of: run the internal combustion engine or adjust an operation of the exhaust treatment system to accommodate degradation of the reductant reagent.

18. The apparatus of claim 17, wherein the controller is further configured to determine the concentration of urea in the reductant reagent based on an input from a urea sensor coupled to the tank.

19. The apparatus of claim 17, wherein the internal combustion engine uses a gaseous or liquid fuel; and
   wherein the controller is further configured to:
      determine a time or a distance since a last refueling event, the last refueling event comprising replacing or adding new fuel to a fuel tank containing the gaseous or liquid fuel;
      compare the time or distance with a threshold time or a threshold distance, respectively; and
      responsive to the time or the distance being greater than the threshold time or threshold distance, respectively, initiate at least one of: run the internal combustion engine, dose the fuel tank containing the gaseous or liquid fuel with an antioxidant, or actuate an indicator indicating that fuel replacement is overdue.

* * * * *